(12) United States Patent
Parriaux

(10) Patent No.: US 6,359,691 B2
(45) Date of Patent: Mar. 19, 2002

(54) DEVICE FOR MEASURING TRANSLATION, ROTATION OR VELOCITY VIA LIGHT BEAM INTERFERENCE

(76) Inventor: Olivier M. Parriaux, 12, rue Gambetta, F-42100 Saint-Etienne (FR)

( * ) Notice: Subject to any disclaimer, the term of this patent is extended or adjusted under 35 U.S.C. 154(b) by 0 days.

(21) Appl. No.: 09/788,444

(22) Filed: Feb. 21, 2001

Related U.S. Application Data

(63) Continuation of application No. PCT/EP99/06057, filed on Aug. 19, 1999.

(30) Foreign Application Priority Data

Aug. 21, 1998 (EP) .............................. 98115810

(51) Int. Cl.[7] ................................. G01B 9/02
(52) U.S. Cl. ...................................... 356/499
(58) Field of Search ................. 356/488, 494, 356/499, 521; 250/231.14, 237 G

(56) References Cited

U.S. PATENT DOCUMENTS 5,009,506 A * 4/1991 Spies .......................... 356/499
5,574,559 A * 11/1996 Kaneda et al. ............... 356/499
5,666,196 A * 9/1997 Ishii et al. ................... 356/499

FOREIGN PATENT DOCUMENTS

| EP | 0 590 162 A | 4/1994 |
| EP | 0 672 891 A | 9/1995 |
| EP | 0 741 282 A | 11/1996 |
| WO | WO 97/16704 A | 5/1997 |

OTHER PUBLICATIONS

Interference Polarizers For The Ultraviolet Spectral Region, pp. 215–219, "Use of Reflecting Diffraction Gratings in Interference Systems for Measuring Linear Shifts. I" by G. N. Rassudova et al.

* cited by examiner

Primary Examiner—Samuel A. Turner
(74) Attorney, Agent, or Firm—Griffin & Szipl, P.C.

(57) ABSTRACT

The device for measuring translation, rotation or velocity includes at least a light source, a light detector, a first grating and a second grating, the first grating being mobile relative to the second grating. A incident beam reaches the first grating where it is diffracted in two beams whose directions are interchanged by the second grating, the resulting beams being then again diffracted by the first grating in an output diffraction direction where they interfere together. Both gratings are used in reflexion.

33 Claims, 12 Drawing Sheets

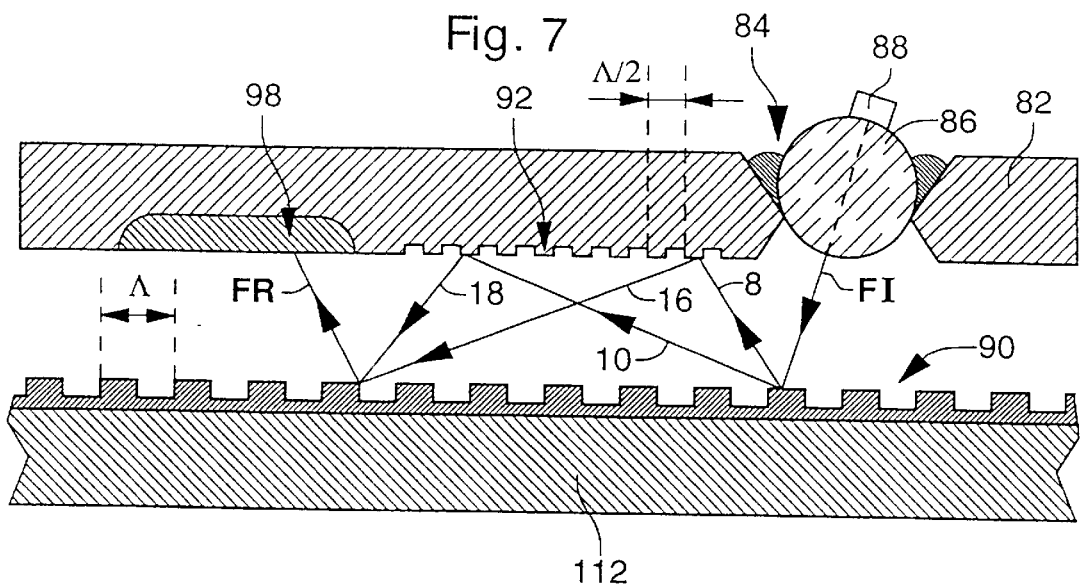
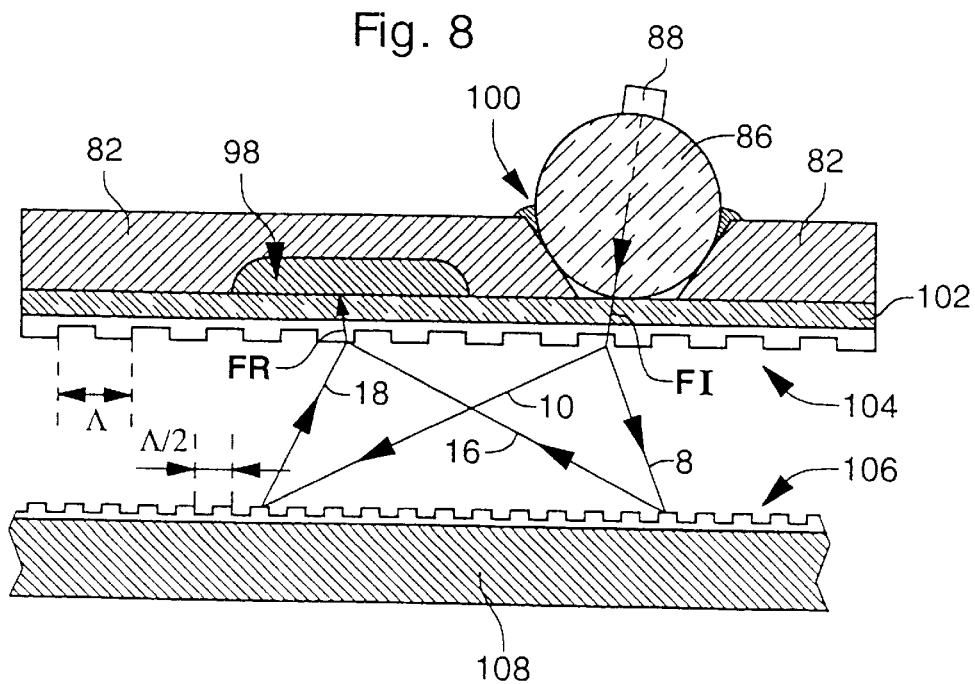

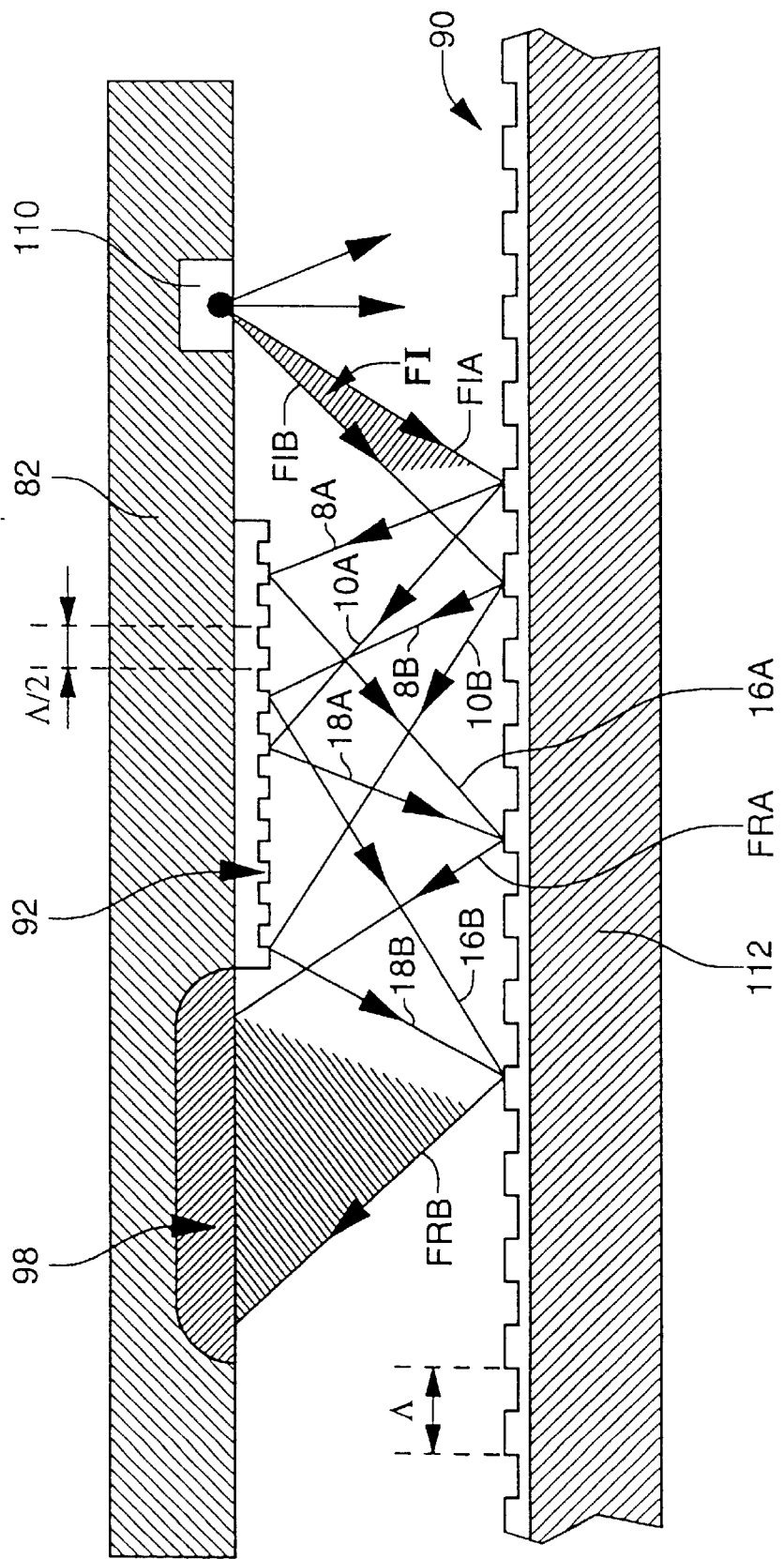

DEVICE FOR MEASURING TRANSLATION, ROTATION OR VELOCITY VIA LIGHT BEAM INTERFERENCE

This application is a con of PCT/EP99/06057 Aug. 19, 1999.

The present invention concerns a device for measuring translation, rotation or velocity via interference of light beams diffracted by diffraction gratings which are substantially parallel to each other.

European application 0 672 891 discloses a device for measuring relative displacements between a head unit and a scale. This device is of the type where all diffraction gratings have the same spatial period or pitch P. The head unit has a light-emitting element (source), a cylindrical lens to condense the light beam provided by the source and a first diffraction grating used in transmission for splitting the light beam. The resulting diffracted beams fall onto a second grating arranged on the scale where they are diffracted in reflexion. The head unit further comprises a third grating used in transmission for mixing the diffracted beams coming back from the scale and a light-receiving element (photodetector). In all embodiments, the source and the photodetector are spatially separated respectively from the first and third gratings so that the head unit has relatively large dimensions. The distance between the mixing grating and the photodetector is actually needed because there is a plurality of interfering beams coming out of this mixing grating. Further, it is to be noted that for each diffraction event, at least one diffracted beam is not used. The unused diffracted beams represent a loss of light power, generate noise, and may lead to spurious interferences. The efficiency of such a measuring device is thus relatively low.

U.S. Pat. No. 5,424,833 discloses a measuring device of another type wherein the first and third gratings are replaced by an unique index grating used in transmission with a pitch twice as large as the pitch of the scale grating. Thus, the scale grating, which is longer than the index grating, has a pitch or spatial period smaller than that of this index grating. Further, all embodiments in this document are arranged so that the incident beam falling on the index grating has a main propagating direction comprised in a plane perpendicular to the moving direction of the scale grating and thus parallel to the lines of both gratings. In order to spatially separate the light source and the photodetector, this document proposes, in a first embodiment, to have said main propagating direction oblique relative to the direction perpendicular to the index grating in said perpendicular plane. In a second embodiment, the incident beam falls perpendicularly onto the index grating and a beam splitter is used which deflects the interference beam coming back normally from the index grating into a direction different from the light source. The first embodiment needs an extended space in a direction perpendicular to the moving direction (measurement direction) and to the direction perpendicular to the gratings. The second embodiment has the following drawbacks: it needs an extended space between the source and the index grating, it is less efficient, and it involves more parts.

European application 0 603 905 discloses a measuring device wherein two gratings are formed on the scale, a first one for splitting the light beam coming from the source and a second one with a pitch twice smaller for interchanging the directions of the two used beams diffracted by the first grating. The mixing grating used in transmission is attached to the photodetector. This arrangement is not very efficient because its resolution is twice as small as the resolution of the device of U.S. Pat. No. 5,424,833 for gratings having pitches identical to those of the latter. Further, the scale is transparent and either its two main surfaces are arranged for diffracting and/or reflecting light beams, or an additional mirror is needed. The scale is thus relatively difficult to manufacture.

An object of the invention is to provide an optical device for measuring relative movements which has great measuring accuracy while remaining of relatively simple construction.

Another object of the invention is to provide such a measuring device the arrangement of whose various parts, in particular the scale or longer grating, can be made within relatively large manufacturing tolerances without adversely affecting the accuracy of measurements.

Another object of the invention is to provide a measuring device of this type wherein the variation in wavelength of the source and of its angular spectrum have no influence on the accuracy of measurements.

Another object of the invention is to provide a device of this type allowing a very flat arrangement which can easily be miniaturised.

A particular object of the invention is to provide a device of this type at least partially integrated in a silicon or semiconductor substrate.

The invention therefore concerns a device for measuring translation, rotation or velocity via light diffraction including a light source, at least one light detector, a first grating or first and fourth gratings of the same spatial period and located substantially in a same first plane, and a second grating or second and third gratings of the same spatial period and located substantially in a same second plane; the first and, where appropriate, fourth gratings being mobile along a given direction of displacement relative to the second and, where appropriate, third gratings, this device being arranged so that a first light beam generated by said source defines a beam incident upon said first grating where this incident beam is diffracted into at least a second beam and a third beam; so that these second and third beams then reach at least partially said second grating or, where appropriate, said second and third gratings respectively, where they are respectively diffracted into at least fourth and fifth beams whose propagating directions are interchanged respectively with the propagating directions of said second and third beams; so that these fourth and fifth beams then reach at least partially said first grating or, where appropriate, said fourth grating where they are respectively diffracted in a same output diffraction direction so that they interfere, said light detector being arranged to detect at least partially light resulting from said interference; the first, second and, where appropriate, third and/or fourth gratings being used in reflexion.

The features of this measuring device allows an easy miniaturisation and its integration by microelectronic and microsystem technologies.

According to a preferred embodiment, said first and, where appropriate, fourth gratings belong to a portion of the device which is mobile relative to said incident beam, said second and, where appropriate, third gratings being fixed relative to this incident beam.

According to a particular embodiment, the first and, where appropriate, fourth gratings have a pitch or spatial period which is twice as large as that of the second and, where appropriate, third gratings, said second and third beams being diffracted respectively into the <<+1>> and <<−1>> orders, said fourth and fifth beams being diffracted respectively into the <<−1>> and <<+1>> orders and these fourth and fifth beams being respectively diffracted into the <<+1>> and <<−1>> orders in said same output diffraction direction by said first or, where appropriate, fourth grating.

According to a preferred feature of the measuring device according to the invention, the light from said incident beam forming said second, third, fourth and fifth beams and finally detected by the detector reaches said first grating at an angle of incidence which is not zero in a plane perpendicular to lines forming the gratings, this angle of incidence being sufficient so that the light source providing said light and the detection region of the detector receiving said light are spatially separated from each other in projection in a plane perpendicular to said lines.

According to a particular feature, said output diffraction direction defines an angle, in said plane perpendicular to lines forming the gratings, which has a value substantially equal to the angle of incidence of the incident beam multiplied by <<−1>> relatively to an axis perpendicular to said gratings, only light interfering along this output diffraction direction being used for measuring a displacement. Thus, the optical arrangement is fully symmetrical and so reciprocal.

Other objects, particular features and advantages of the present invention will appear more clearly upon reading the following detailed description, made with reference to the annexed drawings, which are given by way of non-limiting example, in which:

FIGS. 7, 8 and 9 show schematically three other embodiments of the invention;

Figure 1:
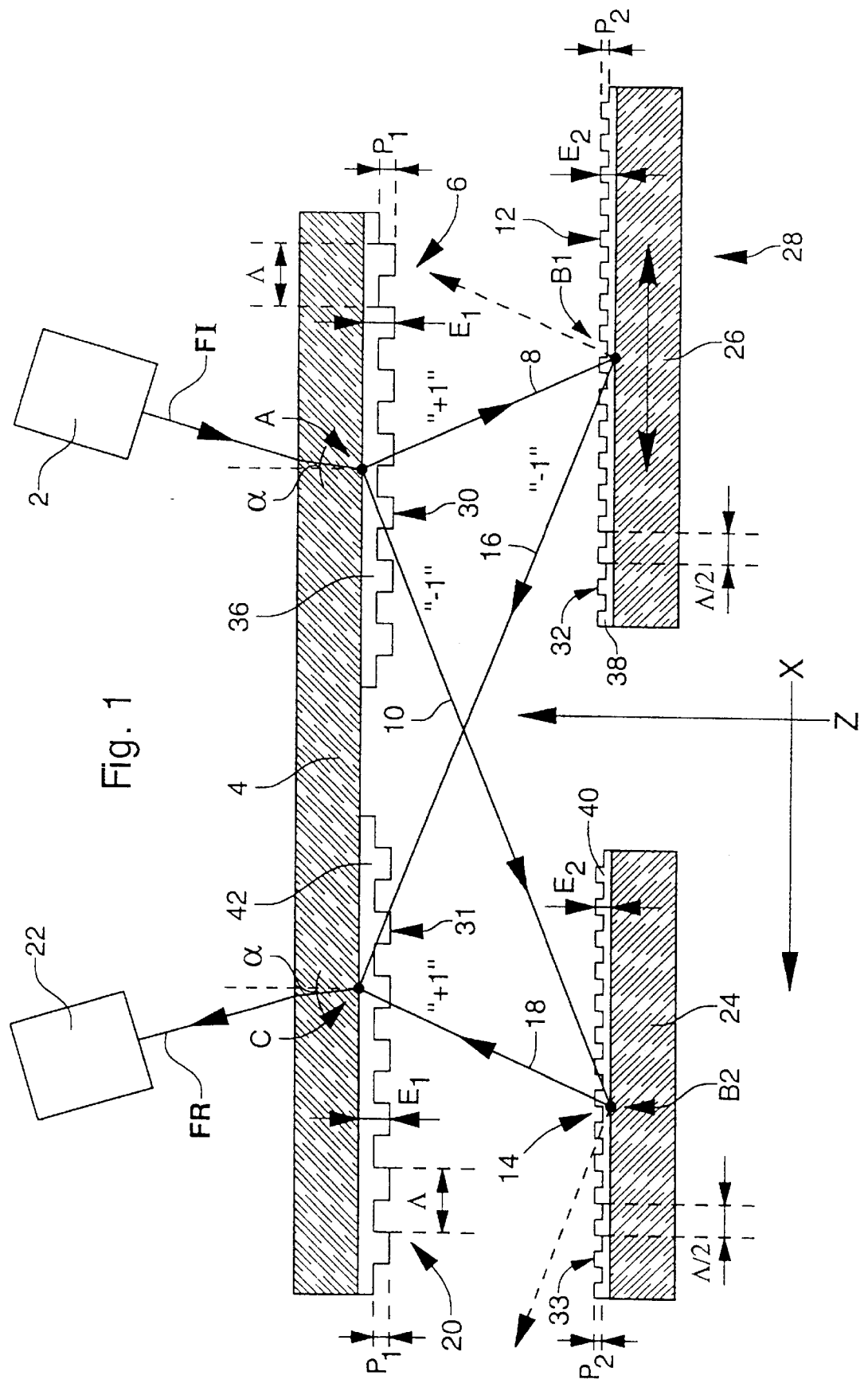
FIG. 1 shows schematically an optical device for measuring a relative displacement.

FIG. 1 shows a translation measuring device including a light source 2 which supplies a first beam FI, which reaches a first transparent structure 4 on one surface of which is arranged a first grating 6 of period $\Lambda$. Beam FI is diffracted into the <<+1>> and <<−1>> orders and generates two beams 8 and 10. Beams 8 and 10 reach respectively second and third gratings 12 and 14 where they are reflected and diffracted respectively into the <<−1>> and <<+1>> orders. Beams 16 and 18 resulting from these two diffractions propagate symmetrically to beams 10 and 8 and are joined together as they reach a fourth grating 20 where they are diffracted, respectively into the <<+1>> and <<−1>> orders, along a same first direction of diffraction offset angularly by angle $\alpha$ relative to an axis perpendicular to grating 20, this angle $\alpha$ being identical in absolute value to angle of incidence $\alpha$ of beam FI incident upon first grating 6.

The two beams generated by the diffraction of beams 16 and 18 in grating 20, along the aforementioned first direction, interfere and together form a beam FR which again passes through transparent structure 4 and is then directed towards light detector 22 arranged for measuring the variation in the luminous intensity of beam FR resulting from said interference. The first and fourth gratings are situated in a same first general plane and arranged on a same face of transparent structure 4. Likewise, second and third gratings 12 and 14 are arranged in a same second general plane of the device. Grating 14 is arranged at the surface of a reflective support 24 which is fixed relative to structure 4, while grating 12 is arranged at a surface of a mobile reflective support 26 moving along a direction X parallel to the aforementioned first and second general planes. In this embodiment, mobile portion 28, formed of support 26 and grating 12 remains in a fixed position along axis Z during measured displacements.

The path travelled by beams 8 and 16, on the one hand, and beams 10 and 18 on the other hand, are identical. Consequently, the phase shift between the two beams 16 and 18 incident upon grating 20 depends solely upon the displacement of mobile portion 28. Those skilled in the art know how to calculate the phase shift generated by a displacement along axis X of this mobile portion 28 for beam 16 generated by the diffraction of beam 8 in grating 12, this phase shift increasing proportionally with the displacement of moving portion 28 and the luminous intensity of beam FR detected by detector 22 varying periodically. Measurement of this periodic variation in the luminous intensity of beam FR allows the displacement of mobile portion 28 to be determined with great accuracy.

Gratings 6 and 20 have a spatial period $\Lambda$ and gratings 12 and 14 have a period which is substantially two times smaller, i.e. substantially equal to $\Lambda/2$ and preferably equal to $\Lambda/2$. This ratio between the spatial periods of the different gratings allows two reciprocal optical paths to be obtained defining a symmetry relative to axis Z. Indeed, due to the particular arrangement of the aforementioned different spatial periods an incident beam FI at point A of grating 6 generates two diffracted beams 8 and 10 which are diffracted respectively at points B1 and B2 along two directions which are symmetrical to the directions of beams 8 and 10 relative to axis Z. Consequently, beams 16 and 18 meet at point C situated on grating 20. There is thus perfect superposition of the two beams interfering along said first direction of diffraction.

It will be noted however that the four gratings can be situated in different general planes if required as long as the relative displacements are effected in displacement planes parallel to these general planes. However, such an arrangement loses certain of the advantages of the device of FIG. 1, in particular its independence relative to the wavelength $\lambda$ of beam FI and its angle of incidence $\alpha$. This is why, although such a solution is not excluded, an arrangement in accordance with FIG. 1 is preferred. Those skilled in the art can demonstrate mathematically that the intensity of beam FR resulting from the interference is independent of angle $\alpha$ and the wavelength of beam FI when gratings 6 and 20 are situated in a first general plane and gratings 12 and 14 are situated in a second general plane of the device. This feature is particularly advantageous for light sources emitting with a certain divergence or numerical aperture in a spectral band of a certain width, i.e. non monochromatic.

According to a particular feature of the present invention, beam FI incident upon first grating 6 has an angle of incidence $\alpha$ which is not zero. Consequently, in the plane of FIG. 1 which is parallel to the direction of displacement of mobile portion 28 and perpendicular to lines 30, 31, 32 and 33 of gratings 6, 20, 12 and 14, the point of incidence A on grating 6 and the point of interference C on grating 20 are separated spatially so that source 2 and detector 22 are separated spatially in projection in this plane and can thus be arranged so as to be globally aligned along a direction parallel to direction of displacement X. This allows very flat measuring devices to be obtained given that the source and the detector can both be arranged in a plane parallel to the measured displacement direction.

Another consequence of non-zero incidence angle α is to prevent the spurious z-dependent modulation signal due to self-mixing when the source is a semiconductor laser.

The device according to FIG. 1 is favourable for measuring a relative displacement between two bodies situated in a same general plane.

Given that only diffraction orders <<+1>> and <<−1>> of grating 6 are useful, this grating 6 is arranged so that the majority of the luminous intensity of beam FI is diffracted into these two diffraction orders to form respectively beams 8 and 10. In particular, the light emitted into diffraction order <<0>> is minimised. Likewise, in the event that the second diffraction order may intervene, grating 6 is arranged so that the light diffracted into this second order is relatively weak.

By way of example, for a wavelength Λ=0.67 μm and an angle of incidence α=10°, diffraction grating 6 is formed in dielectric layer 36 of refractive index approximately n=2.2, in particular made of $Ta_2O_5$ or $TiO_2$ deposited by a technique known to those skilled in the art, on glass substrate 4, the total thickness $E_1$ of this layer being comprised between 0.4 and 0.5 μm. The depth $P_1$ of the grooves situated between lines 30 of grating 6 is comprised between 0.30 and 0.35 μm. Transmission of approximately 80% of the total luminous energy of beam FI is thus obtained in diffracted beams 8 and 10. Defining the grating 6 in layer 36 composed of a high index dielectric material is particularly advantageous since it allows a large diffraction efficiency of the <<+1>> and <<−1>> orders to be obtained with a shallower groove depth $P_1$ than in a lower index layer, or than directly in the transparent structure 4.

Those skilled in the art can also optimise the profile of the section of grating 6 along the transverse plane of FIG. 1 to further increase this selective transmission of the luminous energy or define other grating profilers in layers of different transparent materials such as $SiO_2$ or polymers or solgels. It will be noted that, given that the diffraction events at point C form a reciprocal situation with the diffractions at point A, a difference in the percentage transmitted into the <<+1>> and <<−1>> orders at point A is re-established during diffraction at point C at angle α so that the contributions of beams 16 and 18 along the direction of diffraction selected are identical, which leads to maximum contrast for the interference. It will also be noted that the diffraction efficiency in the aforementioned example is substantially independent of the polarisation of the incident light. The light diffracted into <<0>> order is practically zero. With a period Λ=1 μm, diffraction orders greater than 1 do not exist.

Those skilled in the art will choose for reflection gratings 12 and 14 a corrugated metal surface. It is known that such metal gratings exhibit high diffraction efficiency for beams 8 and 10 of TM polarization only. High diffraction efficiency for the TE polarization requires a large groove depth which is very difficult to obtain in practice when the period is of the order of the wavelength. Furthermore, it is practically very difficult to obtain such metal grating exhibiting comparable large diffraction efficiency for both TE and TM polarizations of beams 8 and 10 as is requested in case the light source is unpolarized. An object of the invention is to provide high diffraction efficiency for the TE polarization, and for both TE and TM polarizations, by using a grating structure comprizing a flat mirror substrate 26 or 24, a dielectric layer 38 and 40, the grating 12 or 14 being realized in the dielectric layer 38 or 40. Such structure associates the diffraction of grating 12 or 14 with the reflection of the reflective substrate 26 or 24 in order to give rise to constructive interference effects in the direction of beam 16 or 18.

In a particular example, gratings 12 and 14 are both formed of a dielectric layer respectively 38, 40 also having a refractive index n=2.2. With a total thickness $E_2$=0.34 μm and a depth $P_2$=0.18 μm for the grooves situated between lines 32 and 33, the luminous intensity diffracted into the <<−1>> order for grating 12 and the <<+1>> order for grating 14 is approximately 50%, the remainder being essentially diffracted into the <<0>> order. Given that beam 8 is diffracted to the right of the direction perpendicular to grating 6, the light diffracted into the <<0>> order by grating 12 does not disturb the measurement in any way since it is not received by detector 22. Likewise, the light diffracted at B2 into the <<0>> order reaches grating 20 at a distance from point C comparable to the distance separating point C from point A. It is thus easy to arrange detector 22 so that the light diffracted at point B2 into the <<0>> order is not detected. This fact favours in particular a ratio between wavelength λ and period Λ generating propagation of beams 8 and 10 to the right and left of the direction perpendicular to grating 6 respectively.

The arrangement of gratings 12 and 14 described in the example hereinbefore is provided for a situation in which the light received is not polarised. However, if the light is TE polarised (electric field vector parallel to the grating lines), thickness $E_2$ of gratings 12 and 14 is approximately 0.1 μm, while the depth $P_2$ is situated at around 0.08 μm and can even be equal to thickness $E_2$. Substrates 24 and 26 are made for example of aluminium or coated with an aluminium film or another suitable metal. Under these conditions, approximately 80% of the luminous intensity of beams 8 and 10 is diffracted respectively in beams 16 and 18. For a TM polarisation (electric field vector perpendicular to the grating lines), one can omit the dielectric layer and the aluminium substrate is micro-machined with a groove depth of approximately 0.12 μm. In a variant, substrate of any type is micro-machined, then coated with a metal film. Thus, the luminous intensity diffracted in beams 16 and 18 is approximately 70%. Again, the profiles of gratings 12 and 14 in the plane of FIG. 1 can be optimised by those skilled in the art so as to increase the transmission of luminous energy in the respective useful directions, in proportions substantially equal but not necessarily equal at points B1 and B2. Other layer materials like other oxides, fluorides, polymers, solgels can be chosen and deposited or coated by different techniques like vacuum deposition, spinning, dipping, in which the grating can be achieve by dry or wet etching, lift-off, photo inscription or moulding techniques.

Dielectric layer 42 of grating 20 has a thickness $E_1$ and a groove depth $P_1$ substantially identical to those of grating 6 so as to assure reciprocity of the diffraction event at C relative to the diffractive event at A. The diffraction efficiencies at C correspond to those given hereinbefore for the diffractions occurring at A.

Finally, in a variant, transparent structure 4 is in two portions which are mobile in relation to each other and carry respectively the first and fourth gratings 6 and 20, while the second and third gratings 12 and 14 are both attached to one of these two portions.

Figure 2:
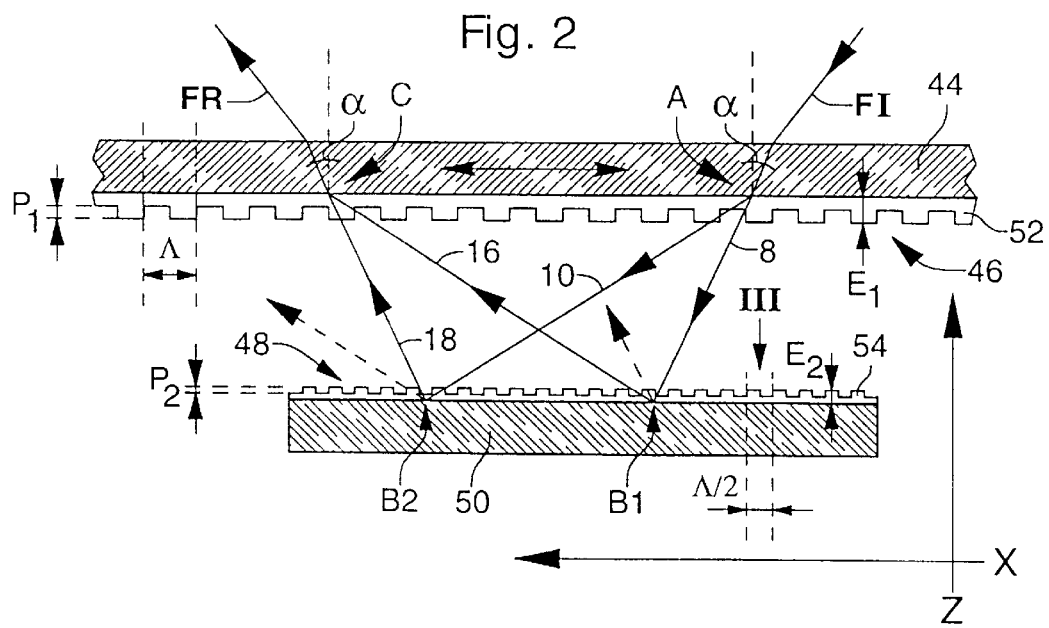
FIGS. 2 and 3 show schematically a first embodiment of a measuring device, according to the invention.
Figure 3:
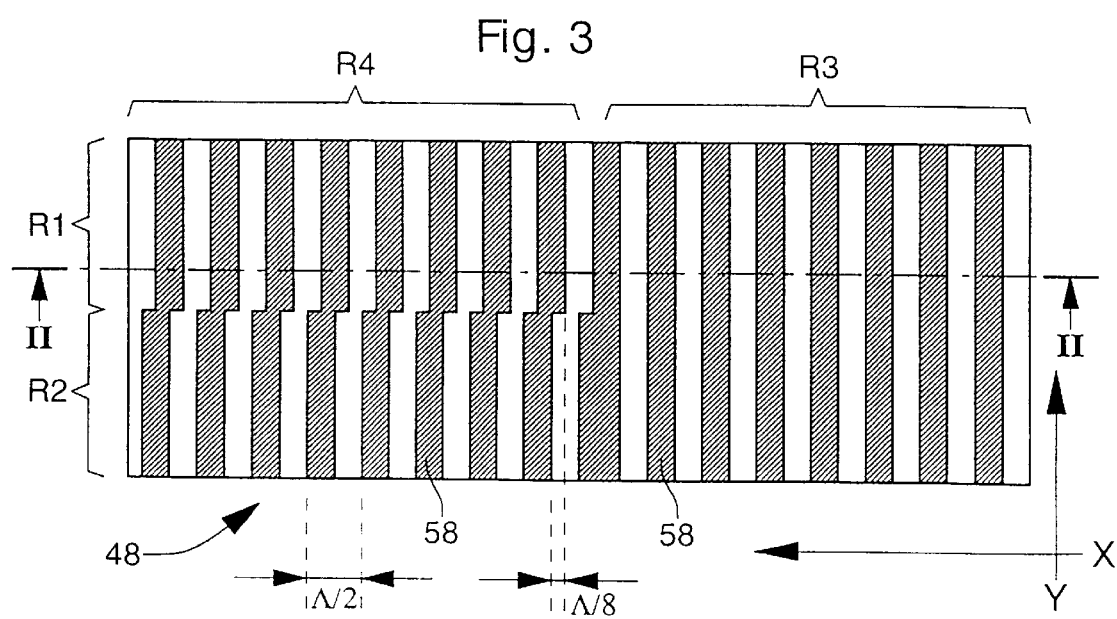

FIGS. 2 and 3 show a first embodiment of the invention. Beam FI generated by a source which is not shown passes through transparent structure 44 and reaches grating 46, at an angle of incidence α, where it is diffracted into the <<+1>> and <<−1>> orders to form beams 8 and 10, as in the first embodiment. However, this second embodiment differs from the first in that beam 8 is diffracted to the left of the direction perpendicular to grating 46. By way of example, the light wavelength λ=0.6 7 μm, angle of incidence α=20° and period Λ=2 μm.

Beams 8 and 10 reach grating 48 arranged at the surface of reflective substrate 50. Beams 8 and 10 are respectively diffracted by grating 48 into diffraction orders <<−1>> and <<+1>> to form respectively beams 16 and 18 which are joined as they reach again grating 46 where they are diffracted along a same diffraction direction, at an angle α relative to the direction perpendicular to grating 46. Beam FR resulting from this interference again passes through transparent structure 4 prior to being detected at least partially by a detector which is not shown.

It will be noted that substrate 50 is here stationary relative to the source and the detector, while structure 44 is mobile along direction X. The luminous intensity of beam FR varies periodically as a function of the displacement of structure 44 relative to substrate 50. This detected luminous intensity and the periodic variation therein allows the relative displacement between structure 44 and substrate 50 to be accurately determined.

In order to optimise the transmission of the luminous energy of beam FI in diffracted beams 8 and 10 and also in order to optimise the transmission of the luminous energy of these beams 16 and 18 in beam FR, for α,λ and Λ given hereinbefore, grating 46 is formed of a dielectric layer 52 of refractive index n=2.2 approximately and having a thickness $E_1$ comprised between 0.35 and 0.40 μm with a groove depth $P_1$ equal to approximately 0.24 μm. It will be noted that this grating structure and these values are given by way of non-limiting example and have been determined for a transparent structure 44 with an index of approximately n=1.5. Under these conditions, approximately 60% of the luminous energy of beam FI is transmitted in diffracted beams 8 and 10 in substantially equal parts, independently of the polarisation of the light. The luminous intensity transmitted into the <<0>> order is low. It is approximately zero for TE polarisation while it reaches approximately 5% for TM polarisation.

In the event that the light is not polarised, second grating 48 is formed by a dielectric layer 54 of refractive index n=2.2 having a total thickness $E_2$ comprised between 0.25 and 0.30 μm with a groove depth $P_2$=0.22 μm. As in FIG. 1, a high efficiency grating comprising a dielectric layer 54 and a reflective substrate 50 is provided, the grating 48 being made in said dielectric layer. Approximately 55% of the luminous intensity of beams 8 and 10 is diffracted respectively in beams 16 and 18. Preferably, the refractive index of the dielectric layers mentioned is greater than 1.8. For the sole TE polarised light, the luminous intensity diffracted into the useful orders at grating 48 can be increased to approximately 70% with a thickness $E_2$ slightly greater than 0.30 μm. Under these conditions, it is possible to obtain 70% of the energy transmitted in beams 16 and 18 while the luminous energy diffracted into the <<0>> order is very low; which is not the case for TE polarisation when thickness $E_2$ is less than 0.30 μm.

The numerical example given here thus allows the luminous energy transmitted into diffraction order <<0>> in grating 46 to be reduced to the maximum and also, although to a lesser extent, in grating 48. Then, the light transmitted into the second diffraction order is relatively small. Consequently, the only significant interference is that generated by the diffraction of beams 16 and 18 in grating 46 respectively into the <<+1>> and <<−1>> orders, at angle of diffraction α. This favourable situation results essentially from the fact that the transmission of beams 16 and 18 into the <<0>> order of diffraction and the orders greater than the first order of diffraction at point C is relatively low, or even zero. Thus, a detector situated in proximity to point C essentially receives beam FR as a light signal varying alternately as a function of the displacement of substrate 44. The other contributions received by this detector generate a substantially constant signal independent of the relative displacement between substrate 50 and structure 44.

In the example given here, the light is essentially transmitted in the useful orders and the low intensity of the light transmitted into the <<0>> order of diffraction at points A and B1 allow any light generating a constant signal to be reduced to the maximum for the luminous intensity received by the detector. It will also be noted that given that the diffraction at point C into the <<0>> order is relatively low, any interference with a diffraction into the second order can generate only a small luminous variation and thus a minor disturbance for the measurement signal propagating at angle α and formed by beam FR. In the examples given hereinbefore, most of the luminous intensity of beams 16 and 18 is diffracted respectively into the <<+1>> and <<−1>> orders, the amplitudes of the diffracted beams into other orders being small or zero. It is to be noted that no particular care must be taken of the luminous intensity in the zero and second orders when the light source is a broadband source like a Light Emitting Diode (LED) since their contribution in the detected signal only amounts to a DC component because of the short coherence length of a LED.

In order to be able to determine the direction of relative displacement between structure 44 and substrate 50, grating 48 has been divided into two regions R1 and R2 along the direction perpendicular to direction of displacement X (FIG. 3). In region R2, grating 48 is also divided into two distinct regions R3 and R4. In region R3, lines 58 of grating 48 are in phase over the two regions R1 and R2. However, in region R4, lines 58 have a discontinuity given that the part of these lines situated in region R2 is offset by Λ/8 relative to the part of these lines situated in region R1. Grating 48 is arranged relative to the light source so that beam 8 reaches grating 48 in region R3 while beam 10 reaches in region R4. In these conditions those skilled in the art can calculate that the offset of Λ/8 provided in region R4 finally generates a phase shift of Π/4 between beams 16 and 18 incident upon grating 46 at point C. Consequently, the luminous intensity resulting from the interference originating from region R1 has a phase shift of Π/2 relative to the interference originating from region R2. By separately detecting the contributions from regions R1 and R2, the detector receives two alternating luminous intensity signals phase shifted by Π/2 in relation to each other. In a variant, it is possible to provide three gratings in parallel with an offset of Λ/6 to give three luminous intensity signals phase shifted by 120°. If beams 8 and 10 are not spatially separated when they reach grating 48, region R2 does not have to be separated into regions R3 and R4. Region R2 as a whole is offset by Λ/16 with respect to region R1 in order to provide an optical intensity phaseshift of Π/2, or by Λ/12 for a phaseshift of 120°. Grating 48 can also be devided into four regions similar to R1 and R2 with three regions having respectively offsets of Λ/16, Λ/18, 3Λ/16 relative to the last one in order to obtain the full set of four quadrature optical power signals.

Thus, on the basis of these two, or three or four separately detected signals, the electronic system of the measuring device can determine the direction of relative displacement between structure 44 and substrate 50 and interpolate finely within the electric period Λ/4 of the luminous intensity resulting from said interference to further increase the accuracy of the measurement. It will be noted that, in the case of the device of FIG. 1, this electric period is Λ/2.

It will be noted that a variation in the spacing between this structure 44 and substrate 50, i.e. a variation in the distance separating gratings 46 and 48 has no influence on the measurement of the displacement along axis X, the two optical paths between points A and C remaining identical and the phase shift between the two contributions forming beam FR and originating respectively from beams 16 and 18 remaining dependent solely on the relative displacement along axis X.

Finally, it will be noted that the phase shift for a given displacement is twice as large in this second embodiment than in the first embodiment of FIG. 1.

Figure 4:
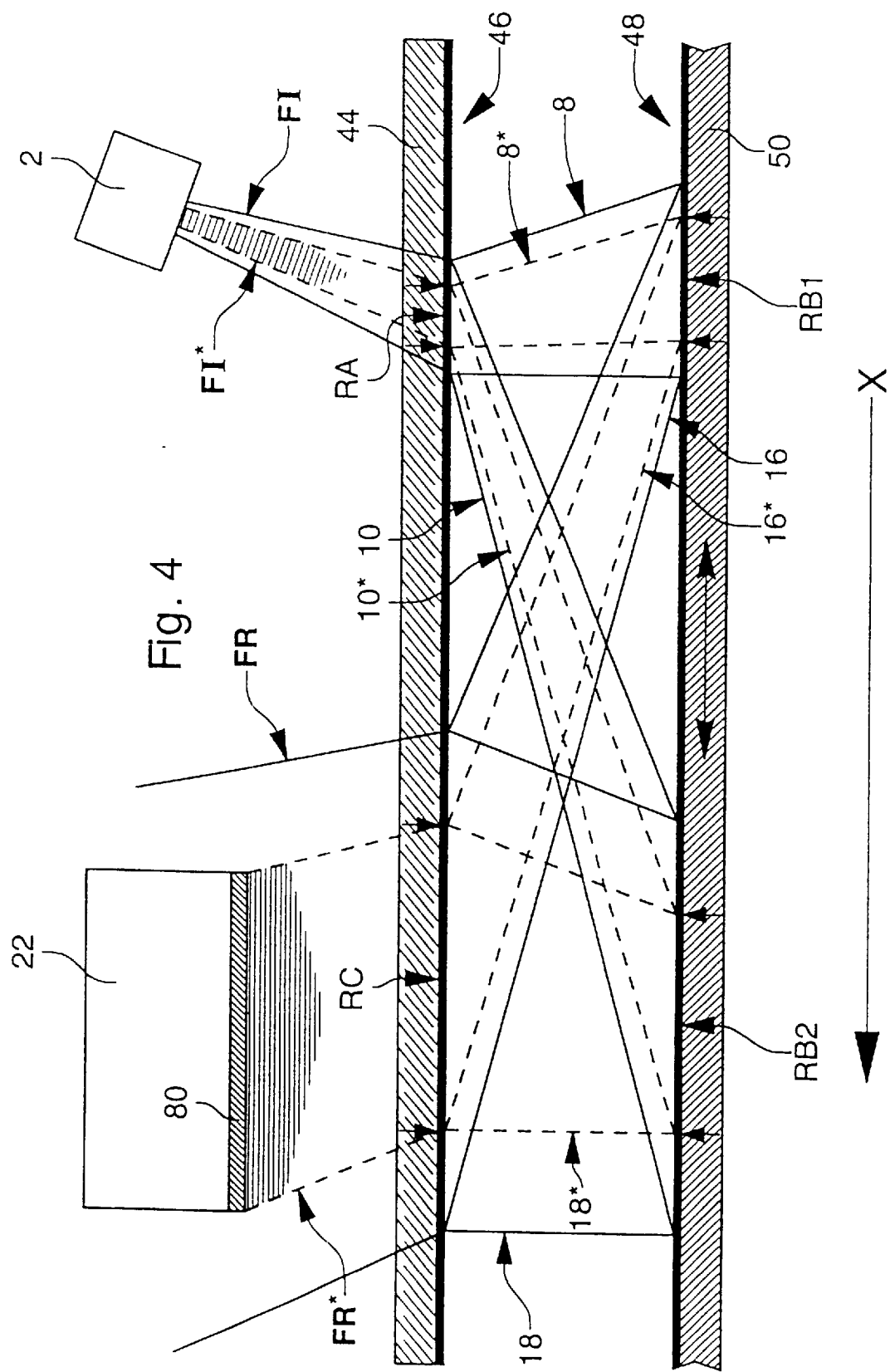
FIG. 4 shows schematically the spatial distribution of the light beams used for the displacement measurement of a second embodiment.

FIG. 4 shows schematically a second embodiment in which transparent structure 44 is stationary relative to source 2 and detector 22, reflective substrate 50 being mobile. Gratings 46 and 48 are the same as those described with reference to FIG. 2. FIG. 4 is given to allow the light useful for the displacement measurement provided by source 2 to be visualised. This source 2 generates a beam FI which has a divergence or numerical aperture and which reaches grating 46 at an angle of incidence varying continuously within a range of given values. It will be noted that this range of values can include the value α=0, i.e. an incidence perpendicular to grating 46. This beam FI generates beams 8, 10, 16, 18 and FR as described hereinbefore. The numerical aperture of beam FI generates a divergence of these diffraction beams.

Since detector 22 is arranged relative to source 2 so that their projections in a plane perpendicular to the lines of gratings 46 and 48 are not superposed, although they are globally aligned along a substantially parallel direction to the direction of displacement, only the light which is comprised in a partial beam FI* and illuminates region RA of grating 46 (comprised between the two arrows in the drawing) forms the partial beam useful for the displacement measurement. According to the invention, the totality of light FI* incident upon region RA has an angle of incidence which is not zero, but sufficiently large for the light finally incident upon detection element 80 to be spatially separated from the light forming beam FI*, in projection in a plane perpendicular to the lines of gratings 46 and 48 corresponding to the plane of the drawing of FIG. 4. When detection element 80 is situated in direct proximity to region RC where partial beams 16* and 18* arrive which generate partial beam FI* detected by detector 22, this condition corresponds to a spatial separation of regions RA and RC of grating 46. Beam FI* which is useful for the displacement measurement thus generates partial beams 8* and 10*, which reach grating 48 respectively in regions RB1 and RB2. From there they are diffracted to form partial beams 16* and 18* and are joined in region RC of grating 46 where they are diffracted along a same direction to form partial beam FR* of beam FR.

In conclusion, whatever the divergence or numerical aperture of beam FI, only partial beam FI* contributes to the displacement measurement and only regions RI, FB1, RB2 and RC define the active regions of gratings 46 and 48 in which the optimising conditions for maximum diffraction efficiency and maximum contrast of the detected interference signal must be fulfilled. It will also be noted that the light forming beam FI* can have a wide spectrum.

Hereinafter, the numerical references already described will not be described again in detail, since they were only given as an example. It is indeed an object of the invention that the gratings can be manufactured with large tolerances without affecting the measurement accuracy.

Figure 5:
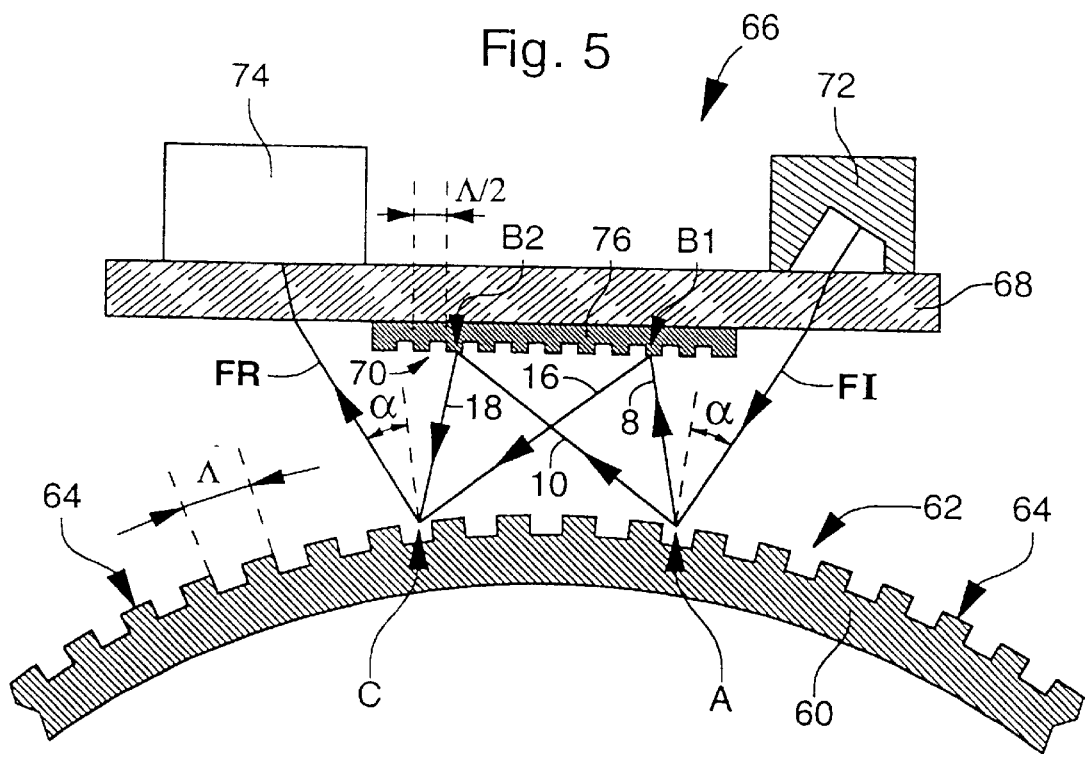
FIGS. 5 and 6 show schematically a third embodiment of a measuring device, according to the invention.
Figure 6:
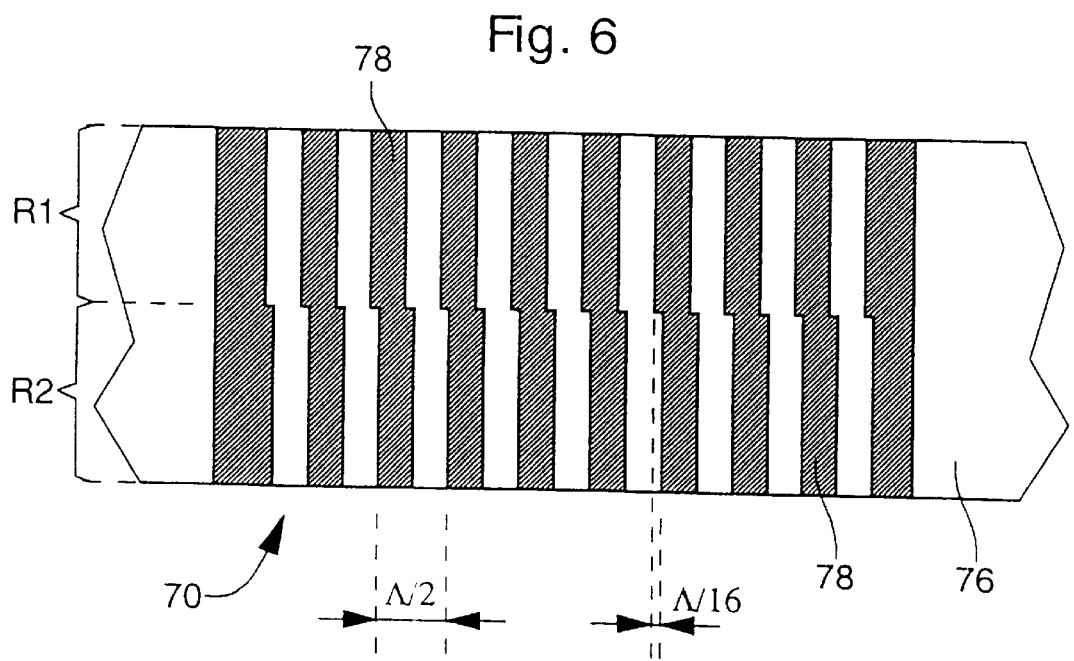

With reference to FIGS. 5 and 6 a third embodiment of the invention will be described hereinafter, wherein an angular displacement of a wheel 60 is measured, said wheel having at its periphery a grating 62 formed of lines 64 parallel to the axis of rotation of wheel 60. Grating 62 defines a scale of period Λ. Facing grating 62 there is provided a measuring head 66 formed of a transparent structure 68 having on its face opposite grating 62 a diffraction grating 70 having a period Λ/2. The ratio of the period of grating 70 to the period of grating 62 is substantially 1/2 when the angle between the normals to grating 62 at points A et C is close to zero. This ratio is smaller than 1/2 when the radius of wheel 60 is small and when the spacing between gratings is large. On the other face of structure 68 are arranged a light source 72 and a detector 74. Beam FI generated by source 72 passes through structure 68 and reaches grating 62 where it is diffracted in reflection essentially into the two orders of diffraction <<+1>> and <<−1>>. Beam FR, resulting from the interference of beams 16 and 18 diffracted in reflection at angle α at point C, again passes through structure 68 prior to being detected by detector 74. Grating 70 is formed in a reflective substrate 76 deposited at the surface of transparent structure 68.

An incremental angle of rotation of wheel 60 corresponds to period Λ of grating 62. Thus, for every displacement of grating 62 relative to measuring head 66 there is a corresponding angle at centre of wheel 60. Consequently, the processing of the alternating luminous signal detected by detector 74 allows an angle of rotation of wheel 60 to be accurately determined.

As in the second embodiment, the direction of rotation of wheel 60 can be detected. In order to do this, grating 70 shown in plane in FIG. 6 has two regions R1 and R2 in which the lines 78 of grating 70 are offset by Λ/16. This offset provided at points B1 and B2 finally generates an optical intensity phase shift of Π/2 in beam FR between the two contributions originating from regions R1 and R2.

FIG. 7 shows a fourth miniaturised embodiment which is partially integrated in a semiconductor substrate 82. This substrate 82 has an aperture 84 wherein is arranged a collimation ball for the light emitted by electroluminescent diode 88 arranged at or close to the surface of ball 86. Diode 88 is arranged so that the central axis of beam FI leaving ball 86 has an angle of incidence which is not zero when reaching grating 90 of period Λ. On the face of substrate 82 situated facing grating 90 arranged on reflective substrate 112 there is provided a reflection grating 92 of period Λ/2. This grating 92 can be either micro-machined directly in substrate 82, in particular in silicon, or be obtained by deposition of one or more layers by deposition techniques known to those skilled in the art. In particular, it is possible to deposit a metal layer followed by a dielectric layer. The lines of grating 92 can be obtained either by micro-machining the dielectric layer or by a two phase deposition, the deposition effected in the second phase forming the lines of grating 92. The resulting beam FR originating from diffraction of beams 16 and 18 in grating 90 is finally detected by detector 98 integrated in substrate 82. Such detectors are known to those skilled in the art, as is the electronic circuit used for processing the light signals received by said detector 98.

It will be noted that the light detector can be formed by a unit which is materially distinct from substrate 82, in particular by a detection unit preceded by a focusing element. In such case, this detection assembly is arranged either in another aperture, or in a recess provided on the face of this structure 82 situated opposite grating 90.

FIG. 8 shows a fifth miniaturised and partially integrated embodiment. Semiconductor substrate 82 comprising integrated detector 98 has a recess 100 in which is arranged the source formed of electroluminescent diode 88 and transparent ball 86. The bottom of recess 100 is closed by a transparent layer 102, in particular made of $SiO_2$ or $Si_3N_4$, arranged on one face of substrate 82 on the side of detector 98. At the surface of this layer 102 is arranged a dielectric layer defining grating 104 of period $\Lambda$. Facing grating 104 is arranged reflection grating 106 of period $\Lambda/2$ at the surface of a mobile reflective scale 108.

FIG. 9 shows a sixth entirely integrated embodiment. The displacement measuring head is formed by semiconductor substrate 82 in which are integrated detector 98 and light source 110. Preferably, source 110 is directly integrated in substrate 82. In a variant, source 110 can be manufactured separately and arranged at the surface of substrate 82 or in a recess provided for the source. Although source 110 emits with a large numerical aperture in several directions, only a portion of the beam generated defines beam FI diffracted by gratings 90 and 92 is finally detected by integrated detector 98. The optical paths of the two end beams FIA and FIB of partial beam FI have been shown so as to visualise the spatial distribution of the different diffracted beams useful for the relative displacement measurement between substrates 82 and 112. The two end rays of each beam are referenced respectively by the letters <<A>> and <<B after the previously used numerical reference. This sixth embodiment allows an ultimate miniaturisation of the measuring device according to the invention and the integration thereof in mechanical and micromechanical devices.

Figure 10:
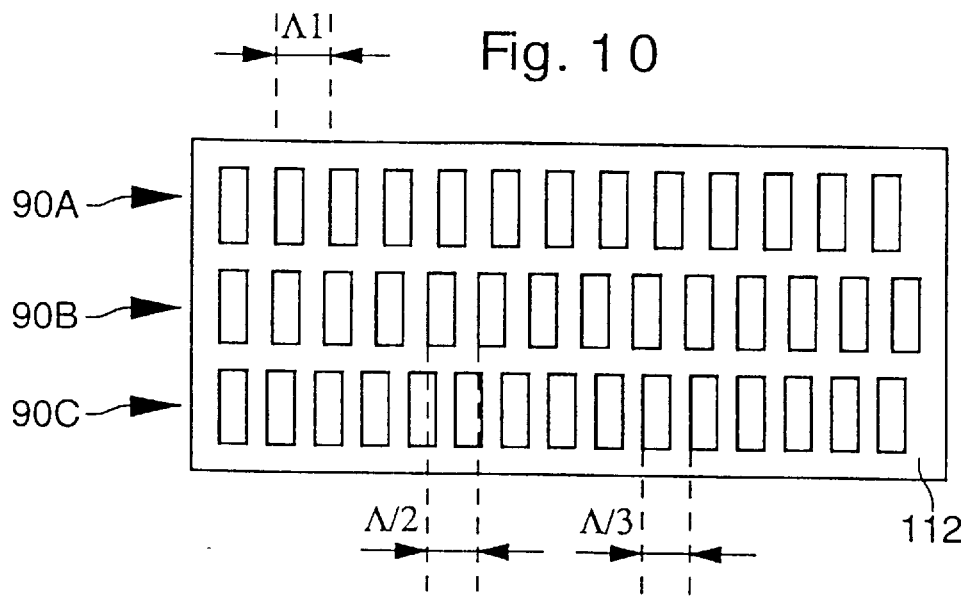
FIG. 10 shows schematically and partially an embodiment allowing an absolute measurement of the relative position between a mobile scale and the fixed portion of the displacement measuring device.

FIG. 10 shows schematically a seventh embodiment of the invention which differs from the sixth in that, in place of a single grating 90, three gratings 90A, 90B and 90C are provided, arranged next to each other and having respectively three different, although relatively close, spatial periods $\Lambda 1$, $\Lambda 2$ and $\Lambda 3$. Grating 92 is also replaced by three gratings (not shown) situated facing the three gratings 90A, 90B and 90C, and each having a spatial period which is two times smaller than the spatial period of the grating which it faces. For each of the pairs of gratings, the application of the optical principle disclosed in the present invention is identical. By selecting appropriate values for $\Lambda 1$, $\Lambda 2$ and $\Lambda 3$, the light intensities, received by a detector having three distinct detection zones for the three pairs of gratings, define a signal corresponding to a single relative position between substrate 82 and substrate 112. Such a device thus enables the absolute position of the mobile portion to be defined relative to the fixed portion of the device. This constitutes an application of the Vernier principle. The device can contain N paths of different periods to assure univocal coding of each measured relative position between substrates 82 and 112.

FIGS. 11 to 14 show schematically four alternative embodiments of the mobile portion relative to the light source and the detector each able to be arranged in any of the embodiments described hereinbefore to define at least one reference position between the fixed portion and the mobile portion of the displacement measuring device.

Figure 11:
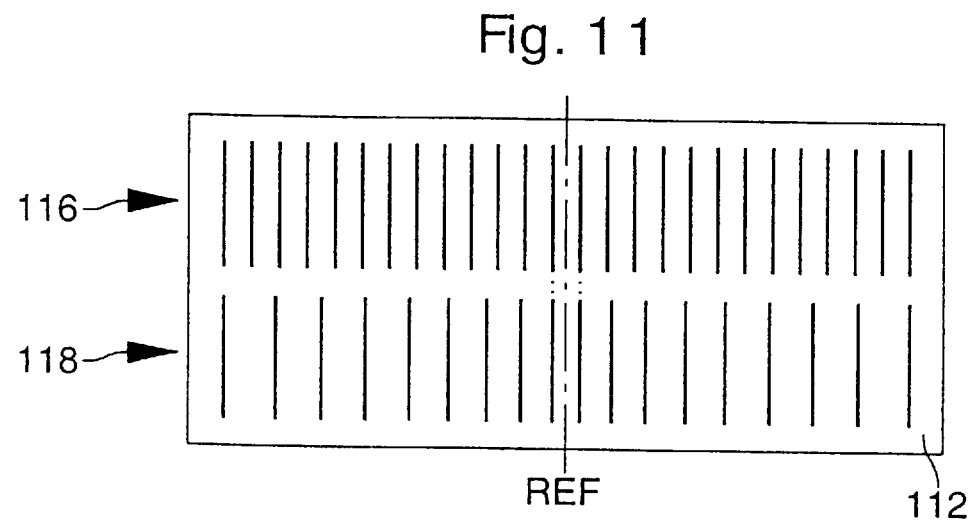
FIGS. 11 to 15 show schematically various alternatives for defining a reference position of the mobile scale of the displacement measuring device.

According to the variant of FIG. 11, in addition to base grating 116 of constant period $\Lambda$ or $\Lambda/2$, there is provided beside this latter another grating 118 of variable spatial period and decreasing to substantially an identical period to that of grating 116, able to perform identically to grating 116 on a certain number of lines, to increase again. The reference position REF is defined by the symmetrical axis of grating 118. The variant of FIG. 12 differs from that of FIG. 11 in that a grating 120 is provided beside grating 116 whose period varies by increasing or decreasing passing from a value higher than the value of the period of grating 116 to a lower value than the latter. Reference position REF corresponds to the middle position of the place of coincidence between the periods of gratings 116 and 120 able to extend over a certain number of lines.

Figure 12:
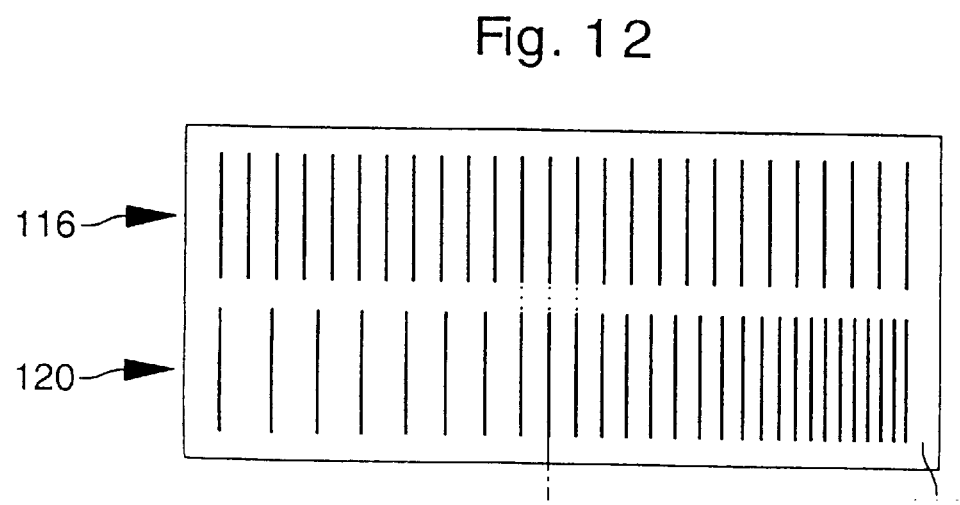

When the light beam sweeps grating 118 of FIG. 11 or grating 120 of FIG. 12, an interference signal is generated on passing across the reference region allowing the displacement measuring detector or another detector to determine reference position REF. This originates from the fact that grating 118 or 120 has only in the reference region a period having a ratio 1/2 or 2/1 with the grating situated opposite on the fixed portion of the displacement measuring device. In other words, there is coding of an absolute or reference position by mutual spatial coherence of the two gratings.

Figure 13:
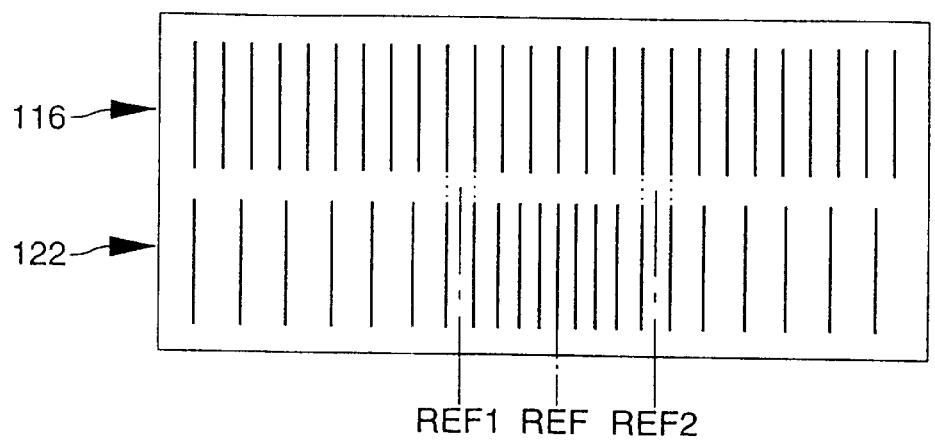

FIG. 13 shows another variant wherein there is provided beside grating 116 a grating 122 of decreasing then increasing variable period passing from a period higher than that of grating 116 to a lower period. Grating 122 has symmetry relative to reference position REF situated between two interference signals occurring at two reference positions REF1 and REF2 where the period is identical to that of grating 116. Grating 122 thus allows two reference positions REF1 and REF2 to be determined, which allows the detected signal processing means to define with great accuracy the central reference position REF.

In FIGS. 11 to 13 it will be noted that in the event that grating 116 has a period $\Lambda/2$, the mutual coherence at the reference location must be verified at least partially for the diffraction events at the diffraction points or regions of incident beams 8 and 10. Consequently, the variant of FIG. 13 can only define one reference position with a spacing between these two points or regions substantially equal to the distance between REF1 and REF2.

Figure 14:
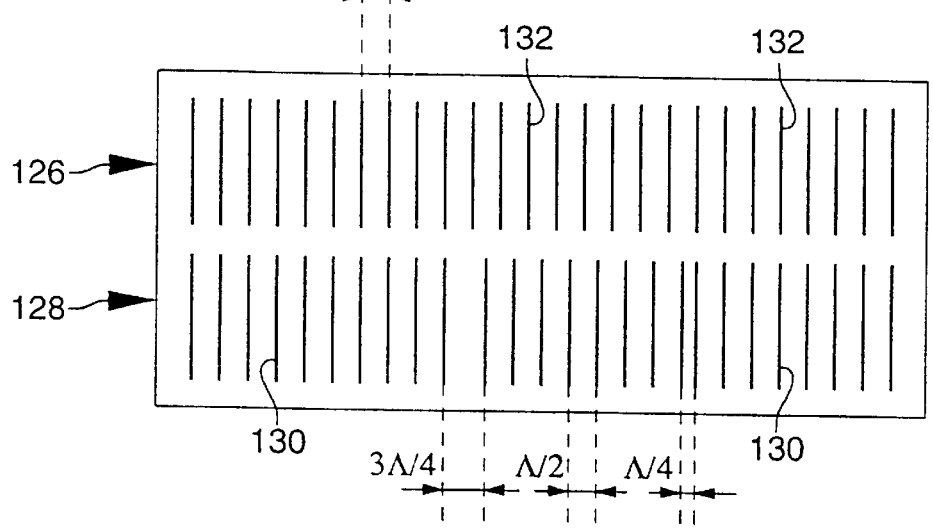

FIG. 14 shows another alternative embodiment wherein the mobile portion relative to the light source includes grating 126 of period $\Lambda/2$. A second grating 128 is provided beside grating 126, these two gratings 126 and 128 being arranged facing the grating of constant period $\Lambda$. Grating 128 is formed of lines 130 defining a period $\Lambda/2$ with two discontinuities defining an phase shift or offsetting of one portion of grating 128 relative to the corresponding lines 132 of grating 126. Grating 128 thus has a first offset of $\Lambda/4$ increasing a space between two lines 130 to $3\Lambda/4$. At a certain distance from this offset a second offset of $\Lambda/4$ is provided decreasing from period $\Lambda/2$, generating a space $\Lambda/4$ between two other lines 130.

Figure 15:
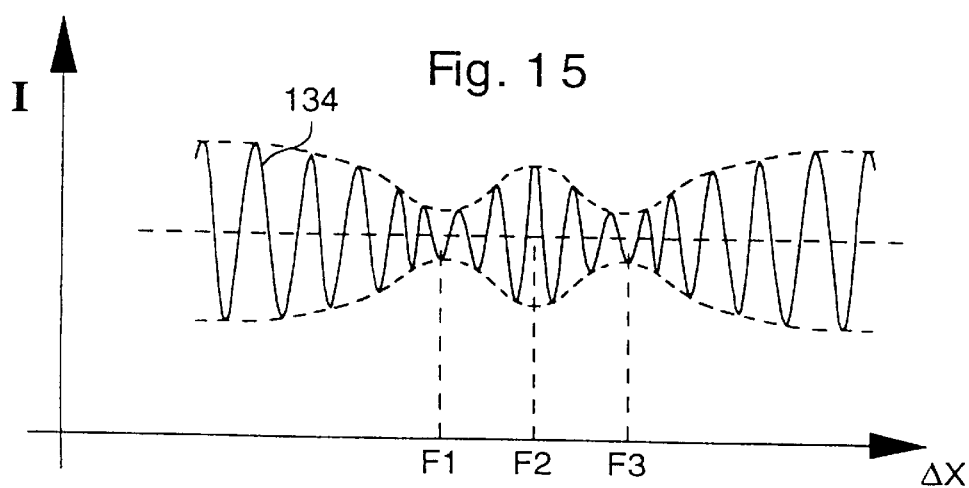

FIG. 15 shows the variation in the luminous intensity detected by a detector as a function of the displacement of grating 128 when the light beam passes through the region including the two offsets of opposite directions described hereinbefore. First, the component AC of the intensity I of beam FR defined hereinbefore decreases given that one increasing portion of this beam includes an interference product having a phase difference of $\Pi$. When more than half of the first offset of grating 128 has been passed through or the second phase jump is reached, the component AC of intensity I again increases to the maximum before again decreasing and then increasing towards the initial mean value. Graph 134 of FIG. 15 thus defines three reference points F1, F2 and F3 allowing three reference positions to be defined or, using a processing unit, central reference position F2 to be accurately defined. It will be noted here that it is possible in another variant to provide a single phase jump of $\Lambda/4$ thus generating a single minimum in the AC component of intensity 1.

Figure 16:
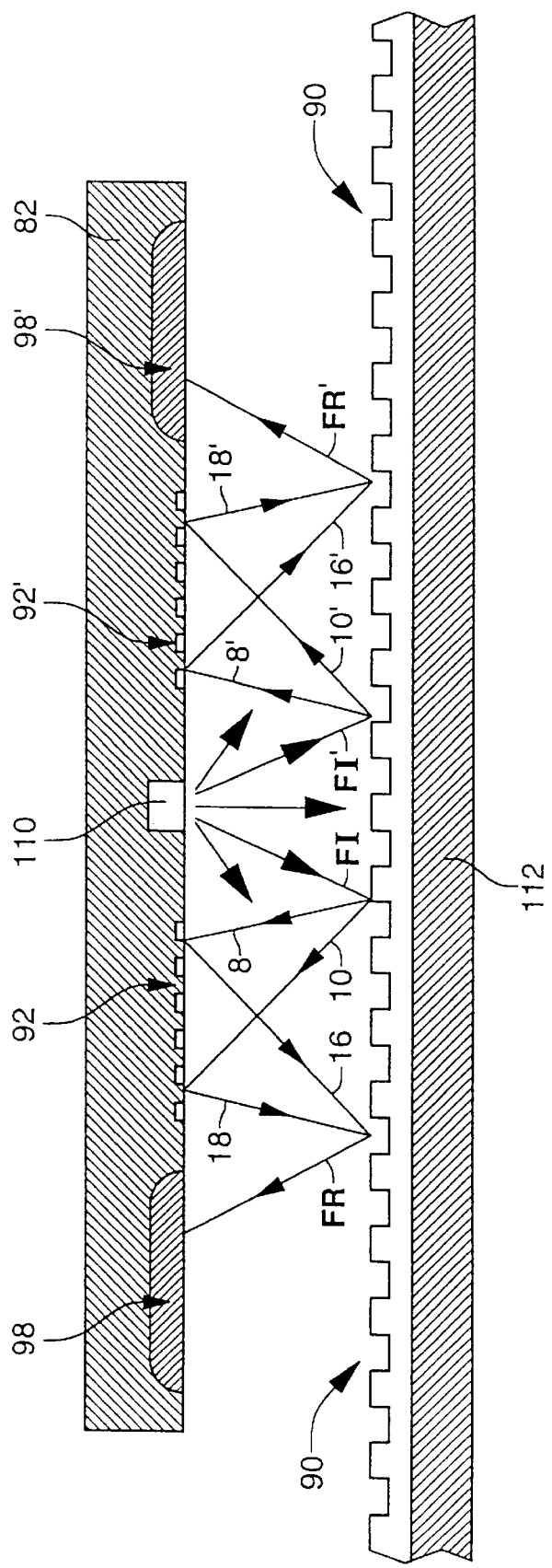
FIGS. 16 and 17 show schematically two other embodiments of the invention.

FIG. 16 shows another embodiment of the invention which is particularly advantageous and able to be miniaturised. The device includes on the one hand a substrate 82 on one face of which is arranged a light source, in particular an electroluminescent diode or a light source integrated in a semiconductor region of substrate 82 and known to those skilled in the art. As in the embodiment of FIG. 9, this source 110 can be a porous silicon light emitting zone, an electroluminescent polymeric emitter in a recess zone, or a LED chip bonded onto substrate 82. This embodiment differs essentially from the sixth embodiment in that a partial beam propagating to the right of light source 110 and another partial beam propagating to the left of said source are used for the displacement measurement. Thus, to the left and right of source 110 are provided two gratings 92 and 92' of period $\Lambda/2$. On either side of these two reflection gratings are arranged two light detectors 98 and 98' integrated in regions of semiconductor substrate 82. The optical paths of the beams diffracted to the left and right of source 110 and the two partial beams used for the displacement measurement are substantially symmetrical. Facing the face of substrate 82 having gratings 92 and 92' is arranged a grating 90 of period $\Lambda$ on a reflective substrate 112.

In order to determine the direction of displacement of grating 90 and to interpolate in a period of the detected luminous intensity signal, a variant provides an offset of $\Lambda(m/4+1/16)$ between gratings 92 and 92' where m is an integer number.

Consequently, the alternating signal detected by detector 98 is phase shifted by $\Pi/2$ relative to the alternating signal detected by detector 98'. However, in order to be free of any dilatation problem, it is preferable to provide two additional gratings phase shifted or offset by $\Lambda/16$ on each side of source 110. The mention of possible expansion leads us to mention here an application of the device according to the invention to temperature measurements by expansion of the substrate formed of materials determined for such application. This is important in rotating or translating mechanical systems where the temperature of the moving parts has to be monitored as a criterion for the system's safety or lifetime.

Figure 17:
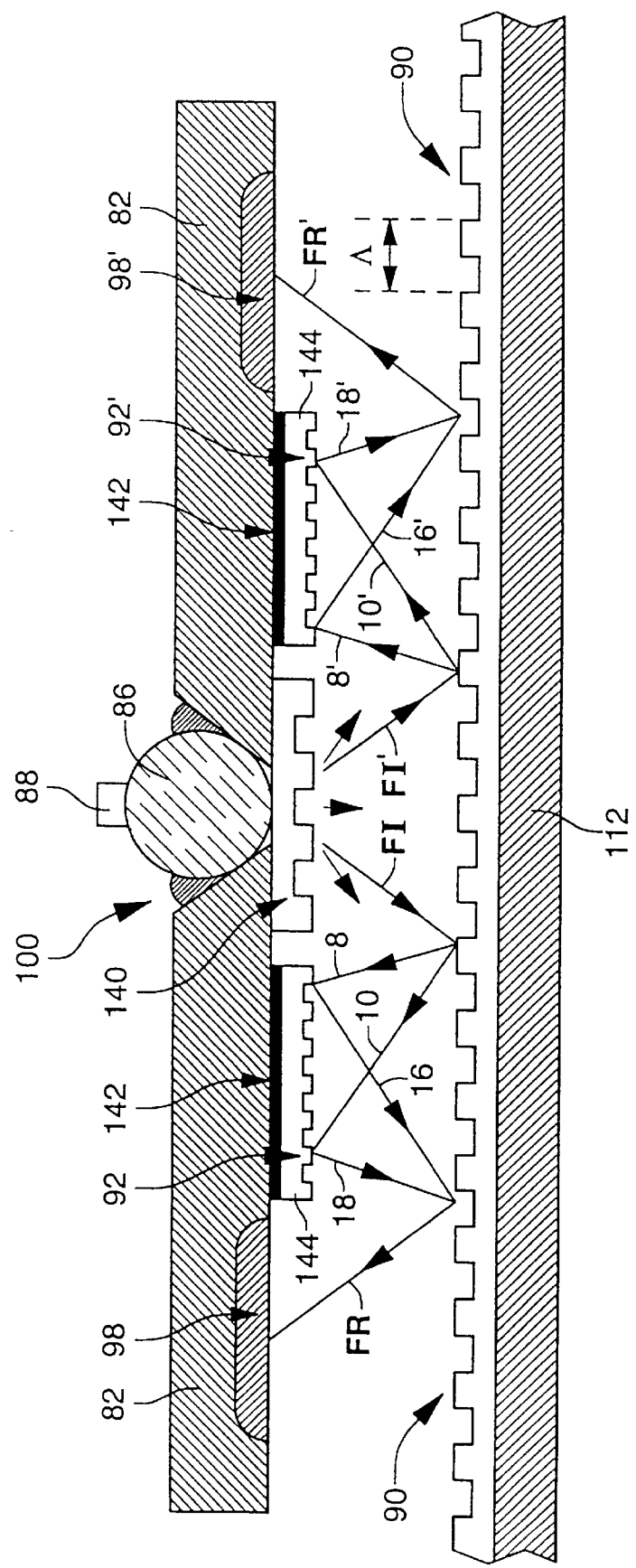

FIG. 17 shows another particularly advantageous embodiment which differs to that described in FIG. 16 in that an opening 100 is provided in the silicon substrate 82 in which a collimation ball 86 is arranged and a diode 88 arranged at the surface or at a distance of said ball 86 so that the direction defined by the centre of diode 88 and the centre of ball 86 is substantially perpendicular to a diffraction grating 140 arranged so as to close opening 100 on the side of the surface of substrate 82 having diffraction gratings 92 and 92'. The light supplied by diode 88 is collimated by ball 86 so that most of the light reaches grating 140 with a substantially perpendicular direction. Grating 140 has a spatial period and a profile determined so that most of the luminous intensity incident upon grating 140 is diffracted substantially in equal parts into the <<+1>> and <<−1>> diffraction orders. The angle of diffraction in the air with respect to the direction perpendicular to grating 140 is for example comprised between 20° and 50°. Thus, most of the luminous intensity provided by diode 88 is transmitted in useful beams FI and FI'. Grating 140 can be formed in a $SiO_2$ or $Si_3N_4$ layer or in a multi-layered structure including in particular a superficial dielectric layer of index n greater than 2.0. Gratings 92 and 92' are formed at the surface of substrate 82 by deposition of a metal layer 142 followed by deposition of a dielectric layer 144, for example $SiO_2$ or $Si_3N_4$ Alternatively, the grating can be first etched into substrate 82 followed by metal deposition.

In a variant, it is possible to provide a polarisation element between ball 86 and grating 140. In another variant, it is possible to provide a transparent layer formed in substrate 82 and defining the bottom of recess 100. On this transparent layer is deposited a dielectric layer in which are formed grating 140 and gratings 92, 92'. It will be noted that any light source may be provided in this embodiment, fixed to substrate 82 or at a distance from the latter. Preferably, the incident light over grating 140 is substantially collimated. However, even for a diverging source, grating 140 allows transmission into the <<0>> diffraction order to be limited and thus the luminous intensity to be concentrated along directions defining a non zero angle of incidence on grating 90.

Figure 18:
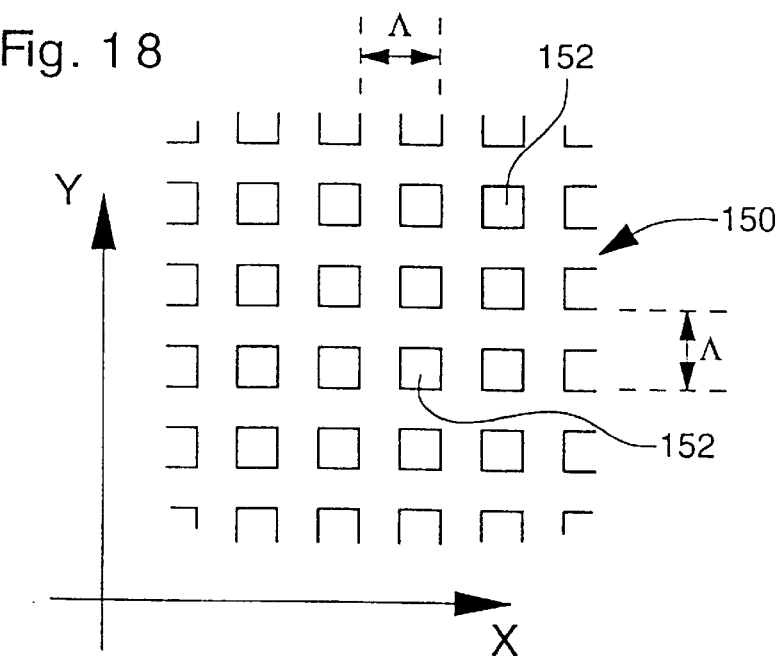
FIGS. 18 and 19 show schematically an embodiment allowing measurement of displacement along two orthogonal directions.
Figure 19:
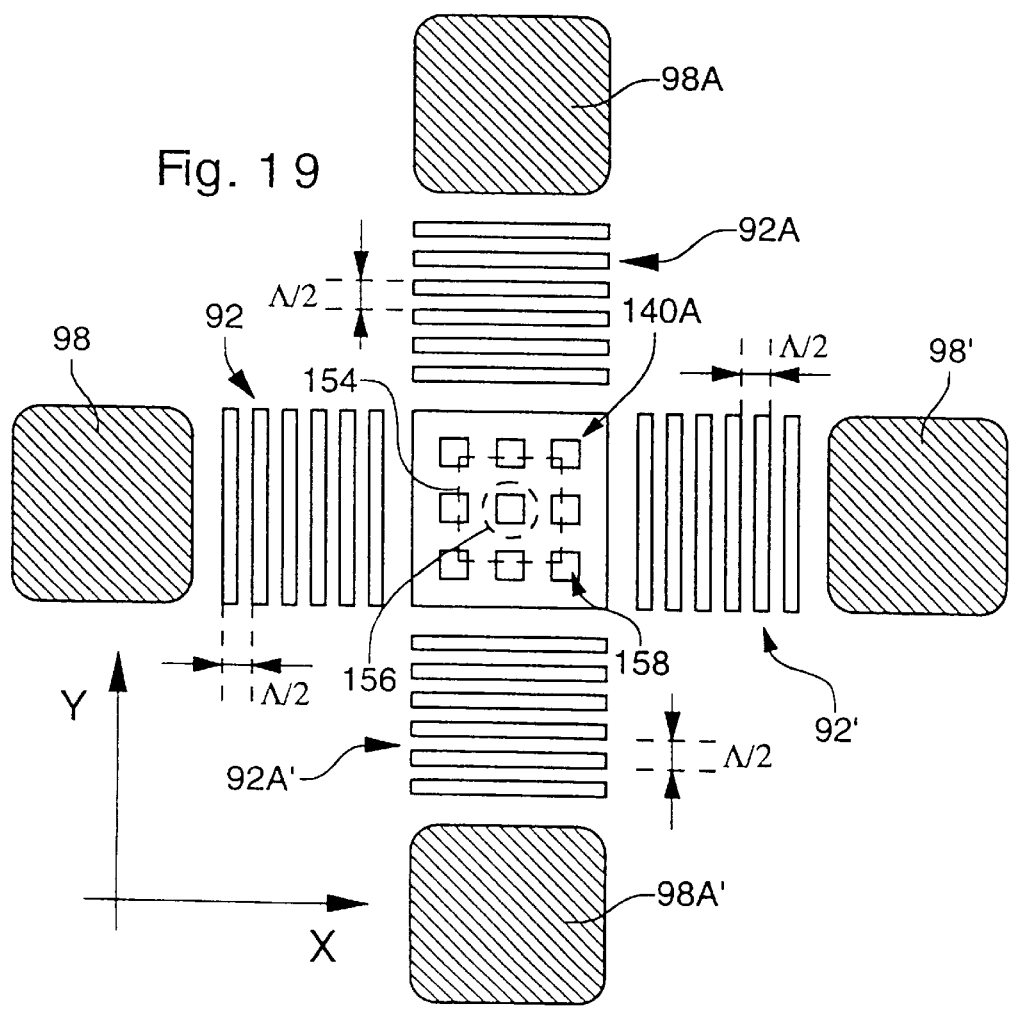

FIGS. 18 and 19 show another embodiment of the invention allowing a displacement along two orthogonal axes of displacement X and Y to be measured. The arrangement along axis X, Y respectively corresponds to the embodiment described hereinbefore in FIG. 17. A bi-directional grating 150 diffracting along directions X and Y is arranged on reflective substrate 112. This bi-directional grating 150 is formed of a set of studs 152 defining grating lines along axes X and Y respectively. It may also be formed by a set of recesses or square hollows, regularly distributed along axes X and Y. Bi-directional grating 150 shown in FIG. 18 is mobile relative to the portion forming the measuring head shown in FIG. 19 and corresponding to the portion associated with the source. The measuring head includes on one of its faces arranged facing grating 150, a bi-directional grating 140A having the same function as grating 140 along the two directions X and Y. Grating 140A diffracts a light of normal incidence essentially into the first diffraction order in directions X and Y. Dotted line 154 represents an opening in the measuring head while the light source supplying a substantially collimated beam is represented by dotted line 156. Grating 140A is formed of studs or square hollows 158 aligned along the two directions X and Y. The measuring head further includes four gratings 92, 92', 92A and 92A' of period $\Lambda/2$ and at least four detectors 98, 98', 98A and 98A' arranged so as to allow optical paths along the two directions X and Y as shown in the embodiment of FIG. 17 for a unidirectional displacement along axis X.

It will be noted that, in a less perfected variant, it is possible to use a diverging source, in particular the source 110 shown in FIG. 16, and to omit diffraction grating 140A. It will also be noted that the embodiments shown in FIGS. 1 to 8 can each also be arranged in a bi-directional displacement device. In order to do this, the light source in particular is arranged so as to emit light along the two directions X and Y in a direction of propagation which is not perpendicular to the diffraction grating of period $\Lambda$ similar to bi-directional grating 150 shown in FIG. 18. In the case of a collimated beam, in particular a laser beam, this beam will be oriented in a non-perpendicular way with respect to the measuring device grating and will have a direction, in projection in the plane X-Y, median to axes X and Y.

Another use according to the invention of the devices corresponding to FIGS. 2, 4, 5, 7, 8, 9, 16, 17, 18 or 19 is the measurement of the relative velocity V along direction X between two gratings, by measuring the instantaneous frequency f of the modulated signal detected in the direction of beam FR by at least one detector. The relationship between f and V is given by V=Λf/4. It allows a direct measurement of the velocity without resorting to phase measurement and period counting.

A further embodiment of the invention for velocity measurement corresponds to FIGS. 2, 4 or 8 whereby grating 48 or 106 is the rough surface of the moving substrate 50 or 108 whose Fourier component along coordinate X corresponding to the spatial frequency of period Λ/2 has non-zero amplitude. Substrate 50 or 108 can be a moving band or wire. Among all the beams scattered in all directions at points B1 and B2 illuminated by beams 8 and 10, only those diffracted in directions 16 and 18 by the spatial frequency corresponding to the spatial period Λ/2 will interfere after recombination along beam FR by grating 46 or 104. Two conditions may preferably be fulfilled for a high constructive interference to take place along the beam FR. The first condition is that the rough surface of substrate 50 or 108 is placed at a distance from grating 46 where beams 8 and 10 have a non-zero spatial overlap on said surface. The second condition is that the length difference AB2–AB1 (FIGS. 1 and 2) between beams 10 and 8 is smaller than the coherence length of source 2. This interference appears as a peak of frequency f in the temporal frequency spectrum of the optical power detected by at least one detector, f being related to the instantaneous velocity V of substrate 50 or 108 by V=Λf/4. Those familiar with the art will easily locate f in the frequency spectrum by resorting to spectral analysis instruments dedicated to Doppler velocimetry. The advantages of the device according to the invention for velocity measurement are the miniaturization, the possible small spacing between the readout head, comprising the light source, the detector and the grating of period Λ, and the moving substrate. Another advantage is the possibility of using a Light Emitting Diode.

A further embodiment of the invention for velocity measurement relates to the previous embodiment where grating 48 is the surface, exhibiting a non-zero spatial component at period Λ/2, of a substrate 50 moving at velocity V. The distinct characteristics with respect to the previous embodiment is that the transparent grating 46 of period Λ no longer has a fixed position relative to the source and to the detector, but translates at a constant and known velocity $v_r$ along X, $v_r$ being larger than the maximum which V can have. In one variant, grating 46 is a radial grating made at the surface of a large radius disk rotating in a plane parallel to the displacement direction X and normal to the plane of incidence of beam F1. In a second variant, grating 46 is a closed grating band rotating on two drums having their rotation axis normal to the incidence plane, the movement of grating 46 between the source/detector assembly and the substrate 50 being rectilinear and in the X direction. Grating 46 is for instance made by embossing in a polymeric foil. The frequency f of the modulated optical power signal measured by the detector is related to the velocities V and $v_r$ through $f=4/\Lambda(V+v_r)$. This embodiments allows the accurate and fast measurement of the velocity V even in case V is close to zero. As a consequence, this embodiment allows an accurate determination of the length of a finite displacement L inclusive of its slow beginning and of its slow end by integrating the velocity V over time t.

$$L = \int_{t_0}^{t_1} V dt = \frac{\Lambda}{4} \int_{t_0}^{t_1} f dt - v_r(t_1 - t_0)$$

where $t_0$ and $t_1$ are the starting and stop times of the displacement. The device according to the invention can therefore be advantageously used to measure the length of long strands of wire, bands, ribbons or sheets of different materials.

Figure 20:
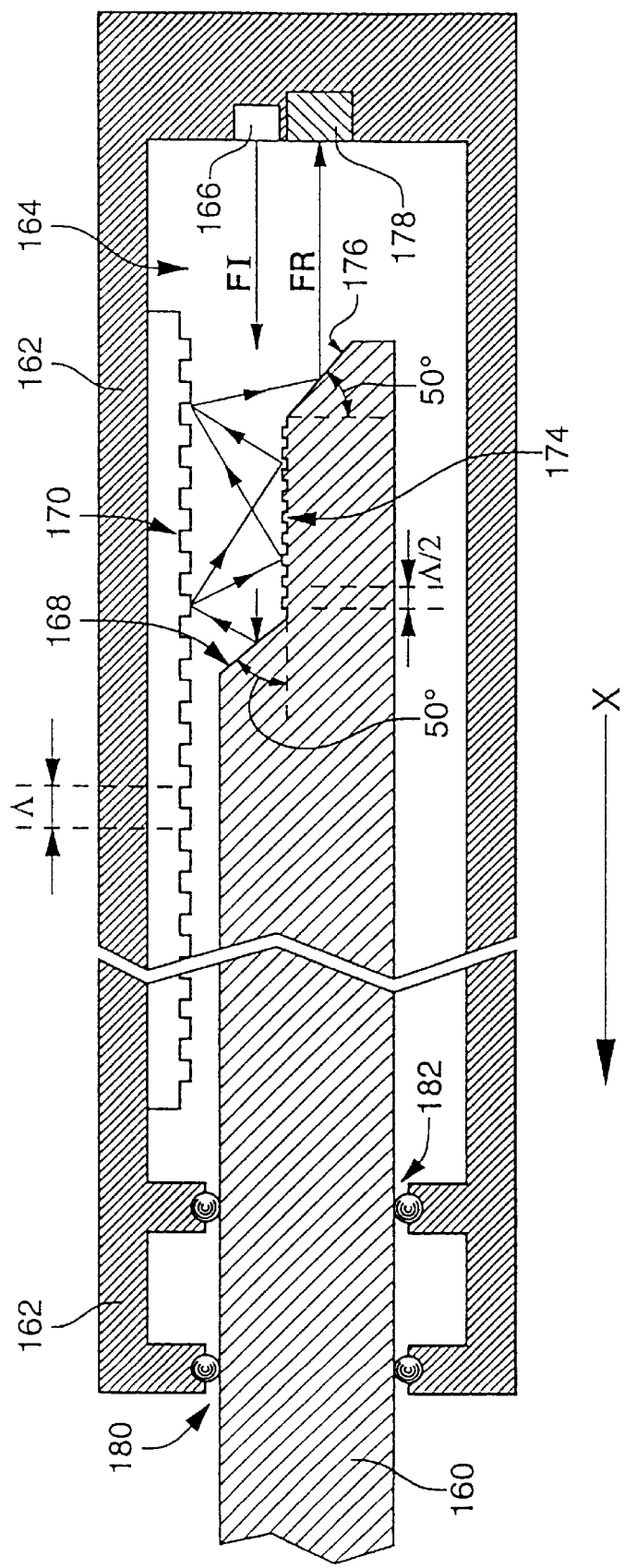
FIG. 20 shows schematically another embodiment of the invention in which the beam emitted by the light source and the interfered beam propagate parallel to the measured displacement direction.

FIG. 20 shows an embodiment of a measuring device with a mobile scale 160 allowing a maximum measurement range for a given grating length and having in addition the advantage that the whole set of the gratings, source, detector(s) and optical paths used for the measurement is entirely contained in a closed case (a tube for example), without the mobile grating associated with scale 160 exiting the case, while the displacement range of this scale (a metal rod for example) can reach a value only slightly smaller than the length of the inner cavity 164 of case 162, and without the scale 160 supporting the source and the detector. In order to do this, a light source 166 emits a beam FI along a direction essentially parallel to direction of displacement X. Rod 160 has in its upper portion a plane 168 inclined at an angle greater than 45° relative to axis X. This inclined plane 168 defines a mirror for beam FI, which is reflected in the direction of a fixed grating 170 of period Λ arranged on a wall of cavity 164. Beam FI thus reaches grating 170 at an angle of incidence which is not zero according to the invention. Scale or rod 160 also includes a reflective surface 162 defining a grating 174 of period Λ/2. Following grating 174 is arranged an inclined plane 176 defining a mirror. This inclined plane 176 defines an angle, relative to a direction perpendicular to gratings 170 and 174, equal to the angle defined between inclined plane 168 and direction X. Thus, the resulting beam FR is reflected along a direction parallel to axis X and is directed towards detector 178.

Those skilled in the art will understand that it is possible to invert the arrangement of source 166 and detector 178, the optical paths remaining the same and the light propagating in a reverse direction to that shown in FIG. 20. In order to assure a stable displacement along axis X, two bearings 180 and 182 are provided at the opposite end to that where the source and the detector are arranged. It will be noted that any other guide means, in particular a slide can be provided as an alternative arrangement.

Other variants using mirrors to deviate and orient incident beam FI and resulting beam FR can be designed by those skilled in the art while remaining within the scope of the present invention and, in particular, of the embodiment described with reference to FIG. 20.

Finally, it will be noted that the gratings can be formed in various ways by various methods known to those skilled in the art, in particular by a periodic variation in the refractive index at the surface of a plane dielectric layer. Moulding and embossing techniques may also be envisaged. The profiles of the transverse sections of the diffraction gratings can be optimised for each particular device in order to increase the efficiency of the displacement measurement according to the principle of the invention.

What is claimed is:

1. A device utilizing light diffraction for measuring translation, rotation or velocity, the device comprising:
   a light source emitting an incident light beam;
   at least one light detector for detecting a resultant portion of the incident light beam emitted from the light source;
   a diffraction grating assembly located on a light path of the incident light beam between the light source and the at least one light detector, the diffraction grating assembly comprising a fixed reflective grating assembly and a mobile reflective grating assembly, wherein the mobile grating assembly is mobile along a given displacement relative to the fixed grating assembly; wherein the fixed reflective grating assembly and the mobile reflective grating assembly diffract a portion of the incident light beam thereby producing interference and the resultant portion of the incident light beam detected by the at least one light detector.

2. A device according to claim 1, wherein the fixed grating assembly comprises a first reflective grating and the mobile grating assembly comprises a second reflective grating.

3. A device according to claim 1, wherein the fixed grating assembly comprises a first reflective grating and a fourth reflective grating and the mobile grating assembly comprises a second reflective grating and a third reflective grating, wherein the first grating and the fourth grating are of a first spatial period and are located substantially in a first plane, and the second grating and the third grating are of a second spatial period and are located substantially in a second plane, wherein the first plane is displaced from the second plane.

4. A device according to claim 1, wherein the fixed grating assembly is mobile relative to the incident light beam, and the mobile grating assembly is fixed relative to the incident light beam and is arranged between the light source and the at least one light detector.

5. A device according to claim 4, wherein the mobile grating assembly, the source, and the at least one detector form an integrated measuring head and the fixed grating assembly further comprises a first reflective grating that defines a scale for the device.

6. A device according to claim 5, wherein the detector is integrated in a semiconductor substrate bearing the mobile grating assembly.

7. A device according to claim 5, wherein the light source is integrated in a semiconductor substrate bearing the mobile grating assembly.

8. A device according to claim 1, wherein the fixed grating assembly has a first spatial period and the mobile grating assembly has a second spatial period that is half the first spatial period of the fixed grating assembly.

9. A device according to claim 4, wherein the fixed grating assembly has a first spatial period and the mobile grating assembly has a second spatial period that is half the first spatial period of the fixed grating assembly.

10. A device according to claim 8, wherein the resultant portion of the incident light beam is directed at a resultant angle relative to a plane perpendicular to lines along which the fixed grating assembly and the mobile grating assembly are formed, the resultant angle having a value substantially equal to an angle of incidence of the incident light beam multiplied by <<−1>> relative to an axis perpendicular to the fixed grating assembly and the mobile grating assembly, such that only light beams interfering along the resultant-angle are measured by the at least one detector for determining a relative displacement.

11. A device according to claim 9, wherein the resultant portion of the incident light beam is directed at a resultant angle relative to a plane perpendicular to lines along which the fixed grating assembly and the mobile grating assembly are formed, the resultant angle having a value substantially equal to an angle of incidence of the incident light beam multiplied by <<−1>> relative to an axis perpendicular to the fixed grating assembly and the mobile grating assembly, such that only light beams interfering along the resultant angle are measured by the at least one detector for determining a relative displacement.

12. A device according to claim 10, wherein the incident light beam enters the fixed grating assembly at the angle of incidence which is not zero in the plane perpendicular to the lines along which the fixed grating assembly and the mobile grating assembly are formed, the angle of incidence being sufficient so that the light source and a detection region of the at least one detector are spatially separated from each other in projection in the plane perpendicular to the lines along which the fixed grating assembly and the mobile grating assembly are formed.

13. A device according to claim 1, wherein the fixed grating assembly comprises a dielectric layer of index n greater than 1.8.

14. A device according to claim 1, wherein the mobile grating assembly comprises a dielectric layer on top of a reflective substrate.

15. A device according to claim 2, wherein the first grating and the second grating are formed of several longitudinal secondary gratings of close but different frequencies thereby allowing an absolute displacement measurement over at least one range of measurement.

16. A device according to claim 3, wherein the first grating, the second grating, the third grating and the fourth grating are formed of several longitudinal secondary gratings of close but different frequencies thereby allowing an absolute displacement measurement over at least one range of measurement.

17. A device according to claim 1, further comprising at least one diffraction grating arranged beside at least one of the fixed grating assembly and the mobile grating assembly so as to define at least one reference position for the at least one detector.

18. A device according to claim 1, further comprising at least one diffraction grating having at least one offset or phase jump incorporated with the lines of the at least one diffraction grating so as to define at least one reference position for the at least one detector.

19. A device according to claim 1, wherein the at least one detector is arranged for measuring a relative velocity between the fixed grating assembly and the mobile grating assembly, wherein a sole measurement of a frequency of detected luminous intensity modulation provides the relative velocity.

20. A device according to claim 2, wherein at least one of the first grating and the second grating has a region with lines offset or phase shifted relative to lines of an other region.

21. A device according to claim 3, wherein at least one of the first grating, the second grating, the third grating and the fourth grating has a region with lines offset or phase shifted relative to lines of an other region.

22. A device according to claim 2, wherein at least one of the first grating and the second grating has a region formed of at least two secondary gratings having a same period and a same phase shifted or off set lines, the phase shifted or off set lines being provided so that the resultant portion of the incident light beam comprises two distinct beams that interfere and produce alternating luminous intensity signals varying as a function of relative position between the fixed grating assembly and the mobile grating assembly, whereby the alternating luminous intensity signals permits interpolation in an electric period of the luminous intensity signals and allows detection of a relative displacement direction between the fixed grating assembly and the mobile grating assembly.

23. A device according to claim 3, wherein at least one of the first grating, the second grating, the third grating and the fourth grating has a region formed of at least two secondary gratings having a same period and a same phase shifted or off set lines, the phase shifted or off set lines being provided so that the resultant portion of the incident light beam comprises two distinct beams that interfere and produce alternating luminous intensity signals varying as a function of relative position between the fixed grating assembly and the mobile grating assembly, whereby the alternating luminous intensity signals permits interpolation in an electric period of the luminous intensity signals and allows detection of a relative displacement direction between the fixed grating assembly and the mobile grating assembly.

24. The device according to claim 5, wherein the light source comprises an electroluminescent diode.

25. The device according to claim 24, further comprising an optical collimation element arranged between the light source and the first grating.

26. A device according to claim 2, wherein the light source emits the incident light beam so that the incident light beam comprises a first partial beam incident upon the fixed grating assembly at a positive angle of incidence and a second partial beam incident upon the fixed grating assembly at a negative angle of incidence, the fixed grating assembly and the mobile grating assembly being arranged on either side of two regions of incidence respectively defined by the first partial beam and the second partial beam incident upon the fixed grating assembly so as to form first to fourth diffracted beams and to generate interference between the fourth diffracted beam and a fifth diffracted beam, thereby producing light detected on either side of the two regions by at least two light detectors arranged on either side of the two regions of incidence.

27. A device according to claim 8, wherein the light source emits the incident light beam so that the incident light beam comprises a first partial beam incident upon the fixed grating assembly at a positive angle of incidence and a second partial beam incident upon the fixed grating assembly at a negative angle of incidence, the fixed grating assembly and the mobile grating assembly being arranged on either side of two regions of incidence respectively defined by the first partial beam and the second partial beam incident upon the fixed grating assembly so as to form first to fourth diffracted beams and to generate interference between the fourth diffracted beam and a fifth diffracted beam, thereby producing light detected on either side of the two regions by at least two light detectors arranged on either side of the two regions of incidence.

28. A device according to claim 26, wherein the source is attached to the mobile grating assembly so that a portion of the mobile grating assembly is situated on either side of the source and offset or phase shifted relative to each other portion so that alternating light signals resulting from interference as detected by the at least two detectors are phase shifted by $\Lambda/2$.

29. A device according to claim 26, further comprising a fifth diffraction grating arranged between the source and the first grating.

30. A device according to claim 26, wherein the source provides a substantially collimated beam propagating along a direction substantially perpendicular to the first grating.

31. A device according to claim 2, wherein at least one of the first grating or the second grating defines a bi-directional diffraction grating having a same spatial period along two orthogonal axes.

32. A device according to claim 2, further comprising at least first and second reflective surfaces, the first reflective surface arranged to deviate a first beam originating from the source and propagating substantially along a displacement direction in the direction of the first grating in order to provide the incident beam, and the second reflective surface arranged to reflect the interfering light along an output direction substantially parallel to the displacement direction before being detected by the at least one detector.

33. A device according to claim 32, wherein the source and the at least one detector are attached to the fixed grating assembly and the first and second reflective surfaces are formed on a rod supporting the mobile grating assembly.

\* \* \* \* \*